Figure 1:
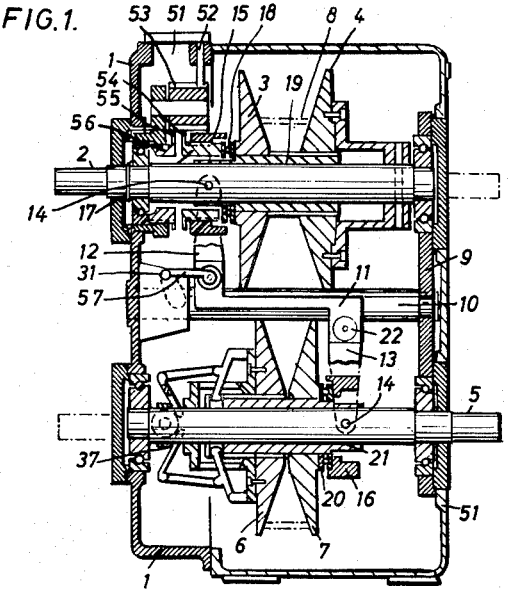

Feb. 15, 1966  A. MAURER ETAL  3,234,806
V-BELT PULLEY VARIABLE TRANSMISSION
Original Filed March 31, 1961

INVENTORS.
ALBRECHT MAURER
WILHELM BESEL
BY
Jacob L. Kollin
ATTORNEY

United States Patent Office 3,234,806
Patented Feb. 15, 1966

3,234,806
V-BELT PULLEY VARIABLE TRANSMISSION
Albrecht Maurer, Hoelderlinweg 18, and Wilhelm Besel, Leopoldsweg 3, both of Bad Homburg vor der Hohe, Germany
Original application Mar. 31, 1961, Ser. No. 99,775, now Patent No. 3,102,431, dated Sept. 3, 1963. Divided and this application Aug. 5, 1963, Ser. No. 299,809
5 Claims. (Cl. 74—230.17)

The present invention relates to V-belt pulley variable transmissions. This application is a division of the co-pending U.S. application Serial No. 99,775, filed by the same applicant on March 31, 1961, now Patent No. 3,102,431.

In that application there is disclosed a V-belt pulley infinitely variable transmission freely detachable unit in which a pair of V-belt pulleys, are mounted on a driving shaft and a driven shaft respectively, each of said pulleys comprising a pair of cone-shaped flanges, one flange of each pair being fixedly secured to its respective shaft, the other flange of each pair being displaceable axially but non-rotatably on said respective shaft, a V-belt being arranged to travel over the pulleys.

In the operation of V-belt pulley variable drives it is desirable to make a subsequent adjustment of a previously preset spacing between the individual drive flange pairs in order to compensate for a possible elongation of the V-belt.

In order to effect this compensation evenly with respect to the median plane of the drive pulley flange pair, there may be advantageously built in a gear, through a maintenance opening in the transmission housing's carrier wall, which, when in a certain set position, may be secured by means of a set screw. This gear may be provided with two toothed flanges. One of these toothed flanges is provided with a thread at the point of the axially displaceable drive flange member. The other gear flange engages with an oppositely threaded member, which acts upon the bearing of the non-rotatable other drive pulley flange. Both gear flanges, together with the member to which they are secured, are thus moved equal distances sideways when the common gear is rotated, whereby both drive flanges are adjusted an equal amount to the right or left relative to an ideal median plane.

When it is desired to bring about the known transfer of rotational moments between the drive pulley flange pairs and their shafts through pressure surfaces which abut against rollers associated with the drive shafts, this transfer is carried out, according to the invention, in such a manner that the same axial pressure is exerted upon the V-belt regardless of the transmission and load ratio with a given peripheral force. For this purpose the following provision may be made.

A lever rod is connected directly or indirectly to at least one of the rotatable but axially non-displaceable drive flanges at two diametrically opposed points. One end of the lever rod is guided in a recess seat of the attached axially displaceable drive flange, while the other end of the lever actuates a swingable stirrup member.

Both swingable stirrups are disposed with their pairs of boss ends perpendicularly to the trunnions arranged at the drive shaft axis, the said ends being provided with flat-surfaced broadened portions. These broadened portions, which form a variable angle, each abut rollers which are supported on a ring at diametrically opposed points. This ring, again, is secured to the attached drive shaft at an axis which is perpendicular to the axis of the trunnions so that a gimbal or Cardan's suspension becomes possible. This arrangement results, along with automatic pressure, on the V-belt pulley flanges, depending on the V-belt's rotational moment, in a stress-free drive, independent of the rotational direction of the drive flange pairs.

Other objects and a fuller understanding of the invention may be had by referring to the following description and claims taken in conjunction with the accompanying drawing.

It should be understood, however, that these are given by way of illustration and not of limitation, and that various changes in the details, form and arrangement of the parts may be made without departing from the scope of the invention.

Figure 2:
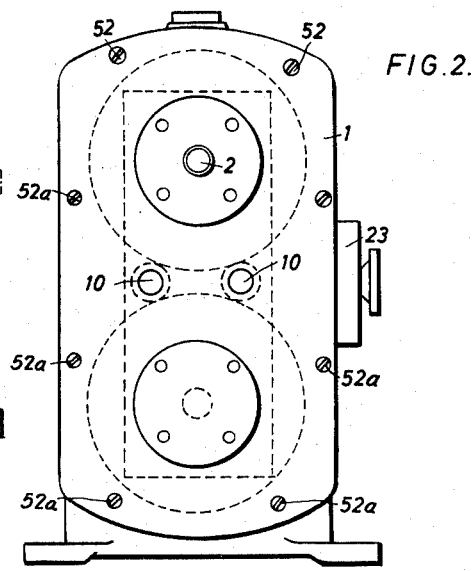
Figure 3:
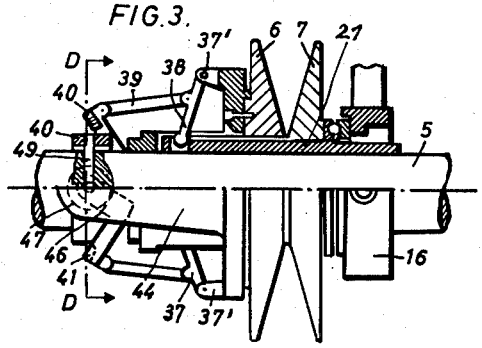
Figure 4:
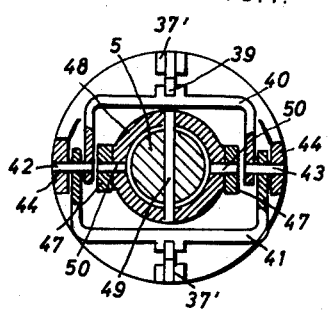
Figure 5:
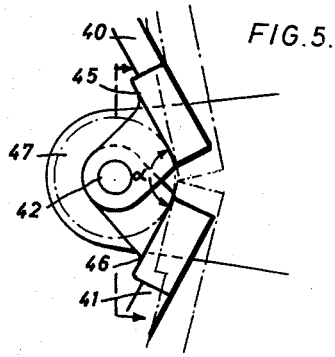
Figure 6:
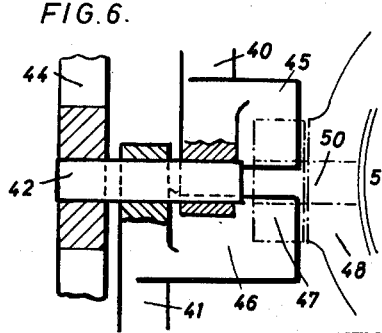

FIG. 1 is a side view in cross-section through the drive in assembled condition, ready for installation,
FIG. 2 is a front elevational view of the device,
FIG. 3 is a view, partly in elevation, partly in section, of the device employed for the automatic application of pressure on the V-belt pulley flanges in dependence on the V-belt's peripheral force,
FIG. 4 is a cross-section taken on line D—D of FIG. 3,
FIG. 5 is an enlarged detail of the device and
FIG. 6 is another enlarged detail of the device.

Referring now to the drawing in detail, the numeral 1 indicates the pan-like carrier wall which supports all the drive parts. It includes the driving shaft 2 with the drive pulley pair 3 and 4 seated thereon, the driven shaft 5 with its V-belt pulley pair 6 and 7 and a suitable structure for the V-belt which serves to transmit the power between the drive pulley pairs.

The drive pulley flanges 4 and 6 are positioned fixedly and non-rotatably on their shaft, while the drive flanges 3 and 7 are liekwise arranged non-rotatably but axially displaceable on their shaft. These known construction parts are mounted in the carrier wall 1 and plate 9 parallel thereto, respectively. The mutual position and spacing of carrier elements 1 and 9 is secured through a traverse or spacer means consisting of two spacer bars 10 which are disposed in the space enclosed by the V-belt 8.

This traverse or spacer means serves simultaneously as a guide for the movable dog or bracket 11 by means of which is effected the axial movement of drive sheaves 3 and 7 relative to the drive sheaves 4 and 6. For this purpose there are provided at the carrier body oppositely directed fork brackets 12 and 13, on the shafts 14 of which are borne swingable ring members 15 and 16. The ring member 15 is connected by means of a right hand thread with the bushing 17 for the thrust bearing 18 and is thereby capable to act upon sleeve 19 on which is rigidly secured drive flange 3. The drive flange 3 thereby follows the movement of the ring body 15 and changes its position relative to the fixed drive sheave 4.

The ring member 16 is disposed over shaft bearing 20 of the drive flange 7 which is diagonal to drive flange 3. Drive flange 7 is keyed to bushing 21 and follows each changed position into which drive sheave 3 is axially displaced in the same sense and for the same distance, while drive flange 6 remains fixed. Rollers 22, on which movable dog 11 is guided, serve to facilitate the moving operation.

The mechanism for transfering the torsional moments between drive pulley flange pair 6 and 7 and the driven shaft 5 is generally indicated by the numeral 37. FIGS. 2–5 illustrate the mechanism's details. The same mechanism may also be provided at drive pulley flange pair 3 and 4. A lever link 38 is secured at each of two dliametrically opposed points 37' to the driven pulley flange 6 which is fixedly and non-rotatably secured to driven shaft 5. One end of each link, 38, is guided in a recess in the shiftable sleeve 21 with which the axially displaceable drive flange 7 follows the adjusting movement of the adjusting dog 11 and part 16. Secured to both links 38, respectively, by means of links 39, are swingable stirrups 40 and 41, the boss-shaped ends of which are rotatably mounted, as adjacent pairs on trunnions 42 and 43 which are disposed at right angles to the axis of driven shaft 5. The trunnions 42 and 43 are fixedly mounted on a support 44 which is secured to drive pulley flange 6. The boss-shaped ends of the swingable stirrups 40 and 41 are formed with flat surfaced broadened portions 45 and 46, which are shown on an enlarged scale in FIG. 6. Similar enlargements are also present at stirrups 40 and 41 in FIG. 4. These broadened portions 45 and 46 form a variable angle (FIG. 5) and abut with their surfaces the two rollers 47, which transfer through the links, the increased peripheral force from the endless belt 8 to the driven pulley pair 6 and 7 and to the driven shaft 5. In addition, both of the rollers 47 are secured to a ring 48, at stations 50 aligned with trunnions 42 and 43, said ring being connected to the driven shaft 5 by means of a pin 49 which is perpendicular to the ring. The slanting position of the swinging stirrups 40 and 41 and thereby of the angle α enclosed by the surfaces 45 and 46 abutting the rollers 47 is set according to the particular spacing of drive pulley flanges 6 and 7 without thereby occasioning a change in the force transferred to the rollers 47. This is dependent solely on the amount of the increased peripheral torque of pulley 3 and is independent of the set transfer ratio between the drive flange pairs.

The represented construction, as shown in FIG. 1 is completed as an enclosed oil-tight unit by means of a housing 51 between carrier wall 1 and the plate 9, and may be attached to a desired machine with or without tihs complement, without any further complications. For this purpose it is only necessary to connect the right stub of the driven shaft 5 with the drive shaft of such a machine, for example, by means of a sleeve and then perhaps provide the connection to the machine frame by means of screws 52a shown in FIG. 2.

To adjust the mutual spacing of a drive pulley flange pair, in this case the parts 3 and 4, in the same direction relative to the middle plane there is employed, as shown in FIG. 1, a gear 53, accessible from without through service opening 51. The displacement of the gear may be arrested by means of screw 57.

Gear 53 meshes with a pair of toothed flanges 54 and 55. The toothed flange 54 is fixedly mounted on the bushing 17, on which is positioned the right-end threaded ring member 15, so that toothed flange 54 acts upon the drive flange 3. The toothed flange 55 is mounted on a ring 56 which is displaceable by means of a left-handed thread relative to a fixed support and thereby displaces drive shaft 2 with its rigidly mounted drive flange 4. When gear 53 is rotated, the toothed flanges 54 and 55 follow and move each of the drive flanges 3 and 4 exactly the same distances towards or away from each other.

The flux of force may also run inversely. In this case the axis 5 is the driving shaft and axis 2 is the driven shaft.

The invention having thus been described, what is claimed and desired to be secured by Letters Patent of the United States of America is:

1. In a V-belt pulley infinitely variable transmission freely detachable unit provided with a driving shaft, a driven shaft parallel to the driving shaft, a pair of V-belt pulleys, each comprising a pair of cone-shaped flanges one of which is fixedly secured to its respective shaft, the other flange of each pair being displaceable axially but non-rotatably on said respective shaft and a V-belt arranged to travel over the pulleys and means for spacing the flanges relative to one another, in combination, a support member secured to the fixed flange and extending axially thereof, a ring mounted on said driven shaft, a pair of rollers secured transversely to said ring on opposite sides thereof, pressure means abutting said rollers, and means operably connecting said pressure means and said displaceable flange.

2. In a V-belt pulley infinitely variable transmission freely detachable unit provided with a driving shaft, a driven shaft parallel to the driving shaft, a pair of V-belt pulleys, each comprising a pair of cone-shaped flanges one of which is fixedly secured to its respective shaft, the other flange of each pair being displaceable axially but non-rotatably on said respective shaft and a V-belt arranged to travel over the pulleys and means for spacing the flanges relative to one another, in combination, a support secured to a fixed flange of one of said pairs and extending axially thereof, a ring mounted on said driven shaft, a pair of rollers secured transversely to said ring on opposite sides thereof, a pair of swingable stirrups one end of which is formed with a flat broadened portion abutting each of said rollers respectively and being pivotable to said support and means operatively connecting the other ends of said stirrups with a displaceable flange of said one pair.

3. In a V-belt pulley infinitely variable transmission freely detachable unit provided with a driving shaft, a driven shaft parallel to the driving shaft, a pair of V-belt pulleys, each comprising a pair of cone-shaped flanges one of which is fixedly secured to its respective shaft, the other flange of each pair being displaceable axially but non-rotatably on said respective shaft and a V-belt arranged to travel over the pulleys and means for spacing the flanges relative to one another, in combination, a sleeve secured to a displaceable flange of one pulley pair and provided with a recess, a lever having one end pivotably secured to the fixed pulley flange of said one pulley pair and another end guided in said recess, a support secured to said fixed flange, a ring mounted on said driven shaft, a pair of rollers secured transversely to said ring on opposite sides thereof, a pair of swingable stirrups, one end of which is formed with a flat broadened portion abutting each of said rollers respectively and with trunnions pivotable in said support and link members having a first end pivotable to the other end of each of said stirrups and to the central portions of said levers respectively.

4. The device according to claim 3, further provided with means for supplemental adjustment of at least one pair of flanges, said means comprising a pair of externally threaded bushings enclosing the shaft on which said pair of flanges is mounted, a regulating gear engageable with said bushings whereby said bushings are propelled in opposite directions for displacing said drive shaft and the fixed flange secured thereto and said movable flange.

5. The device according to claim 4, further provided with a panlike carrier wall said wall having a service opening for providing access to said means for supplemental adjustment and a screw extending through said wall for adjusting the displacement of said gear.

No references cited.

DON A. WAITE, *Primary Examiner.*